June 12, 1956  G. K. McKEE  2,750,142
FITTING OR COUPLING FOR BRACKET ARM
Filed Nov. 8, 1950  2 Sheets-Sheet 1
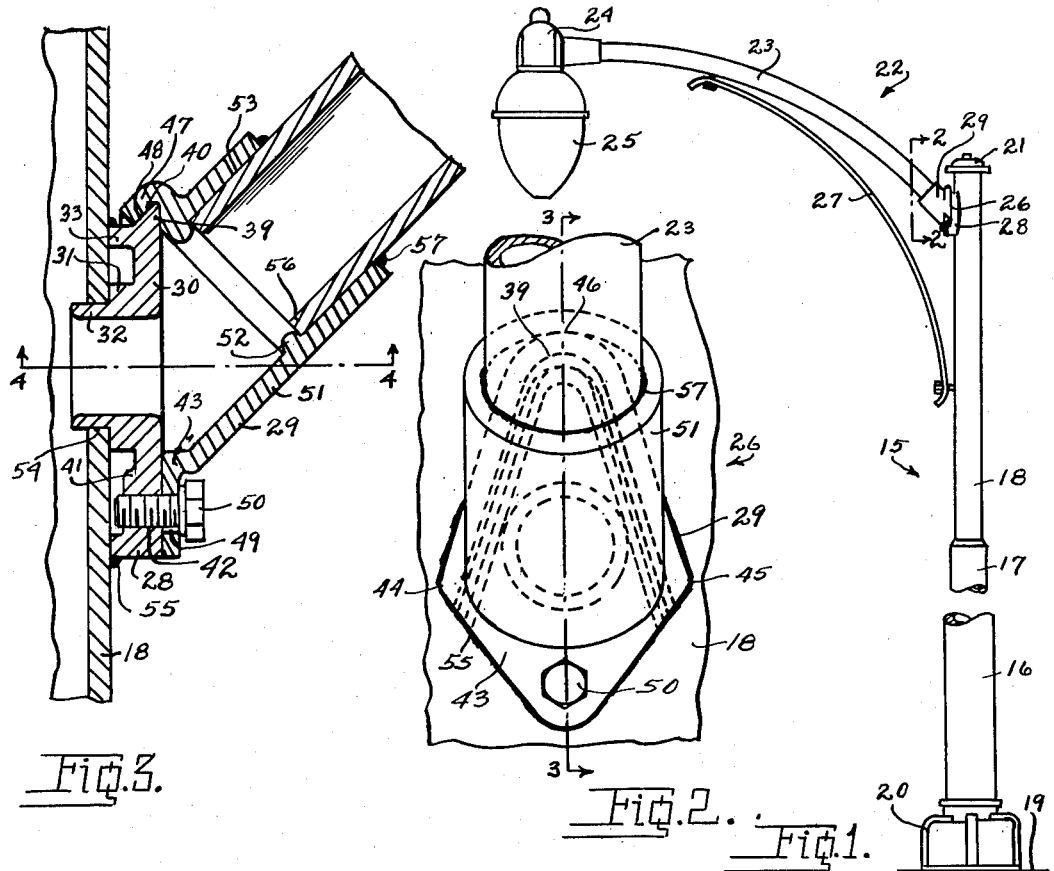
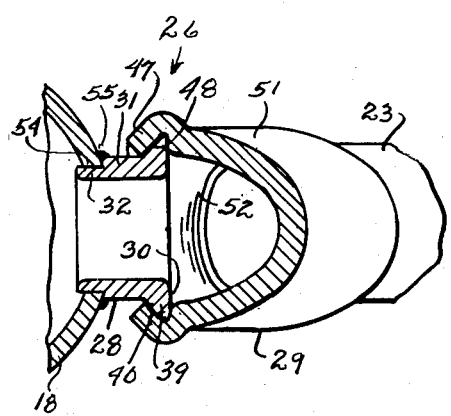
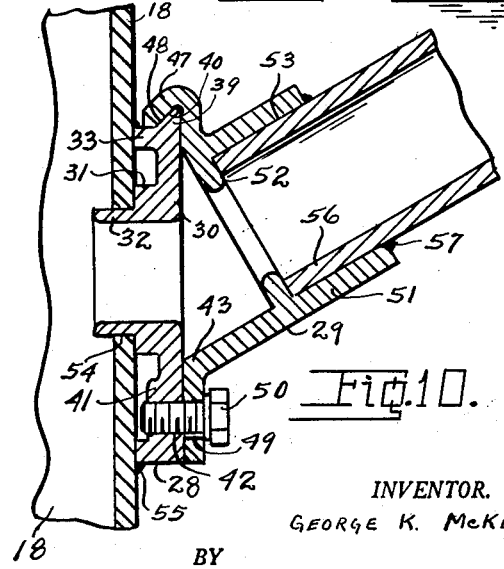
INVENTOR.
GEORGE K. McKEE
BY
Joseph A. Rave
Attorney June 12, 1956  G. K. McKEE  2,750,142
FITTING OR COUPLING FOR BRACKET ARM
Filed Nov. 8, 1950  2 Sheets-Sheet 2

INVENTOR.
GEORGE K. McKEE
BY
Joseph A. Rane
Attorney

United States Patent Office 2,750,142
Patented June 12, 1956

2,750,142

FITTING OR COUPLING FOR BRACKET ARM

George K. McKee, Cincinnati, Ohio, assignor to The Elreco Corporation, Cincinnati, Ohio, a corporation of Ohio Application November 8, 1950, Serial No. 194,675

3 Claims. (Cl. 248—216)

This invention relates to improvements in a fitting or coupling for attaching a bracket arm to a standard, such as a lamp, traffic signal, or the like, supporting bracket arm to the pole, mast, standard, or other support.

Broadly, a bracket arm or support extending from a pole, mast, standard, or the like, with a means for connecting same to one another is old. In the past, considerable difficulty has been experienced in effecting the attachment of the bracket arm to the standard or the means for effecting the attachment was such that under adverse conditions, high winds, and the like, the attaching means were not secure against accidents.

By the present invention a simple fitting or coupling has been provided which overcomes all of the heretofore known difficulties and disadvantages in this connection.

A principal object of the present invention, is, therefore, the provision of a fitting or coupling to be employed between a bracket arm and standard that is simple in construction and economical to produce and use.

Another object of this invention is the provision of a fitting or coupling that has an interlocking connection between the supporting bracket arm and standard that cannot be inadvertently separated but requires a deliberate and positive effort to separate the same.

A still further object of this invention is the provision of a fitting or coupling between the bracket arm and standard which can be located accurately on the said bracket arm and standard, pole or mast, and subsequently connected with assurance that the parts will be in the desired position when mounted in place at the point of use, namely, a street light, traffic light, and the like, wherein the standard can be completed and set in place while the supporting arm is likewise completed and merely assembled with the standard, pole or mast, after the same has been properly placed.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is an elevational view of a street lamp or light assembly including the improved fitting of the present invention.

Fig. 2 is an enlarged fragmentary elevational view of the assembled parts including the coupling or fitting of the present invention as seen from line 2—2 on Fig. 1.

Fig. 3 is a vertical sectional view through the parts of Fig. 2 as seen on line 3—3 on said Fig. 2.

Fig. 4 is a transverse sectional view through the parts in Fig. 3 as seen from line 4—4 on said Fig. 3.

Fig. 10 is a view similar to Fig. 3 showing a modification therein to the extent that the bracket arm may extend from the standard at an angle different from that illustrated in Fig. 3.

Throughout the several views of the drawings similar reference characters are employed to denote the same or similar parts.

Figure 5:
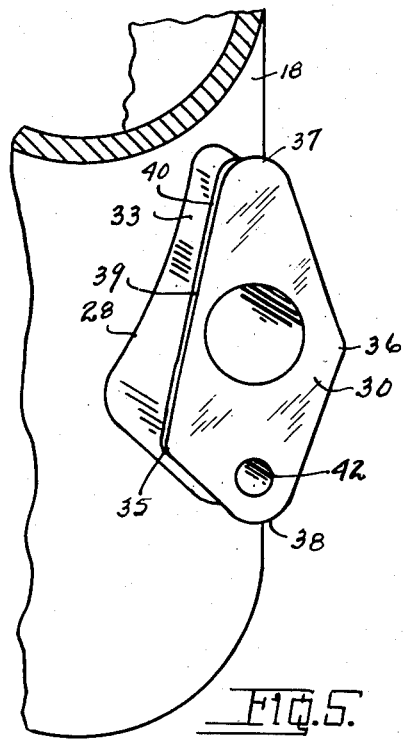
Fig. 5 is a perspective view of a fragment of a standard having secured thereto one part of the fitting or coupling.

The invention is illustrated in the drawings as applied to a street lamp assembly, that is, as connecting the lamp supporting bracket arm to a pole or standard that is normally used along the curb of a sidewalk, so that the lamp overhangs into the street, but it is to be understood that the invention can with equal facility be used for supporting a traffic signal, fire signal, or any other device capable of being supported outwardly of a pole, mast, standard, or other support.

Specifically, as illustrated in the drawings, the standard 15 comprises a plurality of sections 16, 17 and 18 joined to one another in any suitable, desirable, or approved manner and set into or attached to the pavement, street, or the like, 19. A separate and removable base 20 is illustrated as covering the spot where the standard is attached to said street or pavement, said base 20 usually covering the feed wires and the like to the lamp, and the upper end of the standard is usually closed by a cap 21.

The supporting bracket arm assembly, indicated in its entirety by the reference numeral 22, comprises the bracket arm, per se, 23 to the outer end of which is suitably secured a lamp socket 24 from which depends the lamp, per se, 25. Between the bracket arm assembly 22 and standard 15 is the connecting fitting or coupling indicated in its entirety by the reference numeral 26 and which forms the subject matter of the present invention. To further assist in supporting the bracket arm 23 use is made of a bracket arm support rod 27.

Figure 7:
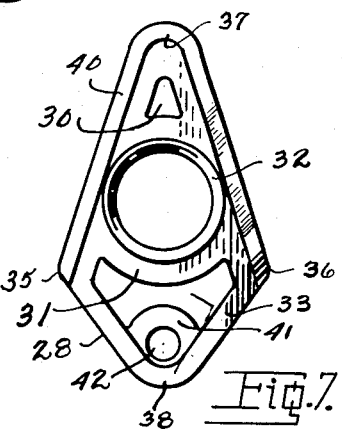
Fig. 7 is a rear elevational view of the part of the fitting or coupling disclosed in Fig. 5, namely, the part secured to and carried by the standard.
Figure 9:
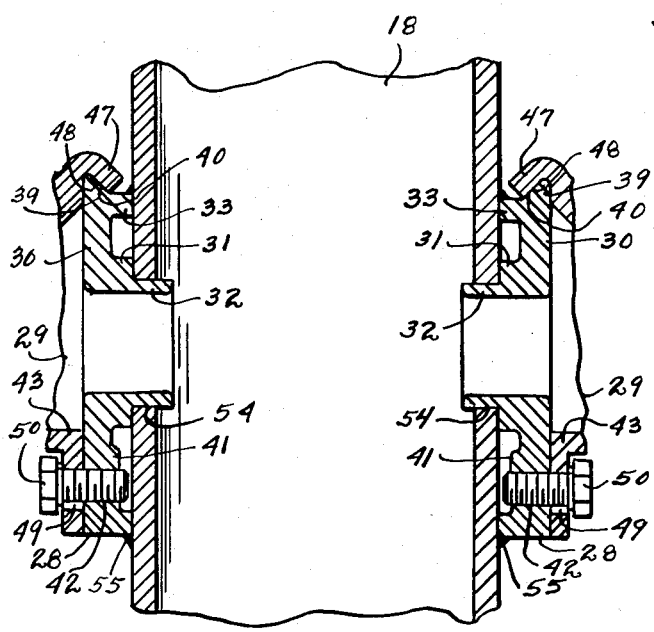
Fig. 9 is a fragmentary vertical sectional view through a standard having a fitting or coupling of the present invention attached to opposite sides of a standard for use in those instances where it is desired to have a lamp, signal, or the like, on each side of the standard.
Figure 8:
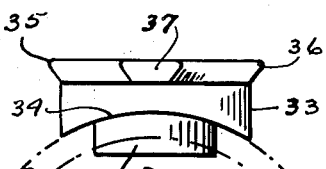
Fig. 8 is a top plan view of the fitting part of Fig. 7.

In general, the fitting or coupling 26 comprises the pole, mast, or standard, or inner member 28 and the supporting bracket arm or outer member 29 respectively carried by the pole, mast, or standard and the supporting bracket arm. The said fitting or coupling inner member 28, as illustrated most clearly in Figs. 2, 5 and 7, is roughly diamond shaped, in plan, and includes a body portion plate 30 substantially centrally of which rearwardly projects a boss 31 from which, in turn, extends a sleeve 32. The aperture through the sleeve 32 extends likewise through the boss 31 and body portion plate 30. Projecting rearwardly at the periphery of the body portion plate 30 is a rim 33 having a depth substantially equal to that of the boss 31 with the rear edge of said rim 33 and surface of the boss 31 forming the rear face of the fitting inner member 28, with said rear face concaved as at 34, in Fig. 8, so as to make a solid seat against the outer surface of the pole or standard to which it is attached.

As seen in Figs. 2, 5 and 7 the portion of the bracket inner member body or plate above the lateral points 35 and 36 is of greater length, to the upper end or point 37, than is the portion of said body or plate below said lateral points 35 and 36, to the bottom point 38. The upper portion of the body portion, namely, the diamond sides between the points 35 and 37 and 36 and 37 is provided with an outward radially projecting rim 39 the inner face 40 of which rim inclines or tapers outwardly toward and terminates in the rib 33. The lower end of the body or plate 30 is thickened, as at 41, and is provided with a tapped aperture 42.

Figure 6:
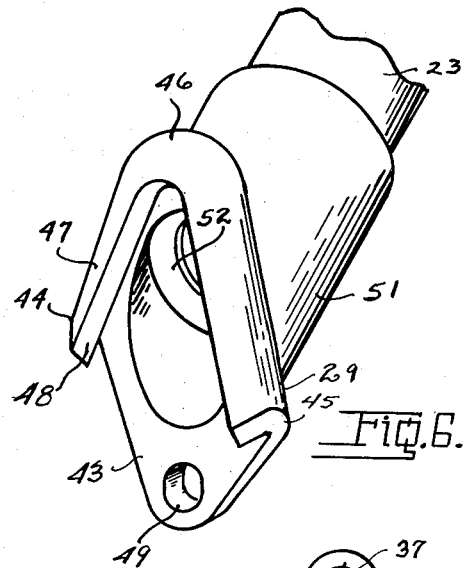
Fig. 6 is a perspective view of a second part of the fitting or coupling which interlocks with the part of Fig. 5.

The fitting or coupling outer member 29 is provided with a body portion plate 43 of the general outline, in plan, and area of the body portion plate 30 of the fitting or coupling inner member 28, that is, substantially diamond shaped as clearly illustrated in Figs. 2 and 6. The body member plate 43 is provided along its long sides, that is, between the lateral points 44 and 45 and its upper point 46 with a substantially rearwardly projecting flange 47 that has its inner face 48 tapered or inclined outwardly and downwardly to substantially correspond with the taper and inclination of the face 40 of the inner fitting or coupling body member flange 39. In practice the rim 39 of the fitting member 28 and the flange 47 of the fitting member 29 thus form a tapered wedge having a transverse dovetail cross-section adapted to interfit with one another. The lower end of the fitting or coupling outer member body or plate 43 is provided with an aperture 49 which, when the parts are in operative relation to one another is aligned with the tapped aperture 42 in the fitting or coupling inner member body or plate 30 to receive a bolt 50 whose head clamps the fitting 29 solidly against the fitting 28 after the wedges are properly interengaged and seated. The aperture 49 is illustrated as slightly elongated to insure alignment of the tapped aperture therewith, but it should be noted that the elongation of the aperture 39 is such that the wedge cannot be disengaged without completely removing the bolt 50.

The fitting or coupling outer member 29 has extending from its body portion 43 a tubular or sleeve-like extension 51 which is illustrated as extending at an upward, outward angle. Intermediate the ends of the sleeve 51 there is inwardly projecting a ridge or rib 52 which forms an inner seat for a socket 53 at the outer end of the said sleeve 51. The angle of extent of the sleeve 51 may be varied to suit conditions or desires of the user, said angle, in Fig. 3, being in the nature of 45° to the vertical, while the illustration in Fig. 10 depicts the angle of inclination as in the nature of 60° to the vertical. It is to be understood that this angle may be varied or changed to any desired angle without deviating from the invention.

In practice, the pole or standard 15 is provided with an aperture 54 at the desired point above the lower end thereof or at the desired point below the upper end whereupon the fitting or coupling inner member 28 is mounted on the pole or standard by having its sleeve 32 projecting through the aperture 54 until the rear face or seat 34 thereof is solidly seated on the outer surface of the standard or pole and with the major axis vertically of the pole. The said fitting or coupling inner member 28 is then secured in position by welding 55 which extends entirely around the edge of the fitting and particularly the edge of the rim 33 which makes the face contact with the said pole or standard. It will be understood that this fitting 28 can be mounted in position while the standard or pole is lying on the ground or at the factory prior to shipment to the site of use. It is, of course, understood that the fitting could very readily be applied to a standard or pole that has already been positioned by merely drilling or boring the standard or pole to provide it with the aperture 54 and setting the fitting or coupling member 28 in position and securing same by portable welding equipment to form the weld 55.

Likewise the fitting or coupling 29 is applied or secured to the supporting arm 23 by merely inserting the inner end 56 of said supporting arm into the socket 53 of the sleeve 51 and securing these parts to one another by a continuous weld 57 that joins the upper end of the socket 53, or sleeve 51, to the arm 23 upwardly of its inserted end 56. It will of course be understood that the said fitting or coupling inner member 29 is positioned to have its vertical axis aligned properly with the arm 23 and the vertical axis of the lamp 25 secured to the outer end of the arm 23.

The parts are assembled by merely interengaging the dovetailed wedges of the fitting or coupling members 28 and 29 whereupon the bolt 50 is screwed home to prevent inadvertent disassociation of said interfitting dovetail wedges. It will be readily appreciated that the relatively long wedge of the fitting members prevents any springing of the parts toward a disengagement particularly should wind, or the like, cause a slight upward movement of the supporting bracket arm assembly relative to the standard or pole 18 which has, in the past occurred. It will further be noted that the assembly of the parts on the job can be very readily and quickly accomplished with a minimum of tools and skilled labor and that the objects initially set forth are otherwise accomplished.

What is claimed is:

1. A fitting or coupling for securing a bracket arm to a cylindrical pole, or the like comprising an inner member having a plate of greater length than width and having a front face, a back face, an upper end and a lower end, the sides of said plate converging toward the upper end from transversely aligned points, said points being intermediate the upper and lower ends, but nearer the lower end, a outwardly projecting rim extending from the converging sides and upper end of said plate, said rim having a front face and a rear face, said rear face being inclined inwardly and rearwardly from its peripheral edge, a rib projecting rearwardly from the plate adjacent the outwardly projecting rim, said rib being concave laterally and adapted to seat on said pole, said rib adapted to be welded to said pole, an outer member having a plate of a configuration complementary to that of the inner member plate, said outer member plate having a rear face from which a flange projects, said flange being undercut, said undercut being complementary to the outwardly projecting flange on the inner member plate, whereby the outwardly projecting flange and the outer member flange may be interlocked, said outer member having a socket extending upwardly and angularly from the front face thereof, said socket adapted to receive a bracket arm, and a projection on the rear face of the inner member adapted to engage an aperture in said pole, to anchor and locate said inner member relative to said pole.

2. A fitting or coupling for securing a bracket arm to a cylindrical pole, or the like comprising an inner member having a plate of greater length than width and having a front face, a back face, an upper end and a lower end, the sides of said plate converging toward the upper end from transversely aligned points, said points being intermediate the upper and lower ends, but nearer the lower end, a outwardly projecting rim extending from the converging sides and upper end of said plate, said rim having a front face and a rear face, said rear face being inclined inwardly and rearwardly from its peripheral edge, a rib projecting rearwardly from the plate adjacent the outwardly projecting rim, said rib being concave laterally and adapted to seat on said pole, said rib adapted to be welded to said pole, an outer member having a plate of a configuration complementary to that of the inner member plate, said outer member plate having a rear face from which a flange projects, said flange being undercut, said undercut being complementary to the outwardly projecting flange on the inner member plate, whereby the outwardly projecting flange and the outer member flange may be interlocked, said outer member having a socket extending upwardly and angularly from the front face thereof, said socket adapted to receive a bracket arm, and a projection on the rear face of the inner member adapted to engage an aperture in said pole, to anchor and locate said inner member relative to said pole, and means for securing the inner and outer members to one another after the interlocking of the said inner member outwardly projecting flange and the outer member flange.

3. A fitting or coupling for securing a bracket arm to a cylindrical pole, or the like comprising an inner member having a plate of greater length than width and having a front face, a back face, an upper end and a lower end, the sides of said plate converging toward the upper end from transversely aligned points, said points being intermediate the upper and lower ends, but nearer the lower end, an outwardly projecting rim extending from the converging sides and upper end of said plate, said rim having a front face and a rear face, said rear face being inclined inwardly and rearwardly from its peripheral edge, a rib projecting rearwardly from the plate adjacent the outwardly projecting rim, said rib being concave laterally and adapted to seat on said pole, said rib adapted to be welded to said pole, an outer member having a plate of a configuration complementary to that of the inner member plate, said outer member plate having a rear face from which a flange projects, said flange being undercut, said undercut being complementary to the outwardly projecting flange on the inner member plate, whereby the outwardly projecting flange and the outer member flange may be interlocked, said outer member having a socket extending upwardly and angularly from the front face thereof, said socket adapted to receive a bracket arm, and a projection on the rear face of the inner member adapted to engage an aperture in said pole, to anchor and locate said inner member relative to said pole, said inner member plate adjacent its lower end having a tapped aperture, said outer member plate adjacent its lower end having an aperture adapted for axial alignment with the inner member plate tapped aperture, and a clamping bolt projecting through the outer member plate aperture into threaded engagement with the inner member plate tapped aperture for securing the inner and outer members to one another after the interlocking of the inner member outwardly projecting flange and the outer member flange.

References Cited in the file of this patent

UNITED STATES PATENTS

| | | |
|---|---|---|
| 255,708 | Wassmer | Mar. 28, 1882 |
| 606,208 | Gutman | June 28, 1898 |
| 661,986 | Heizer | Nov. 20, 1900 |
| 2,138,647 | Schofield | Nov. 29, 1938 |
| 2,173,159 | Ewan | Sept. 19, 1939 |
| 2,195,013 | Rastetter et al. | Mar. 26, 1940 |
| 2,540,784 | Hocher | Feb. 6, 1951 |

FOREIGN PATENTS

| | | |
|---|---|---|
| 122,329 | Great Britain | of 1918 |
| 489,181 | Great Britain | of 1938 |